United States Patent [19]
Chicklis et al.

[11] 4,371,969
[45] Feb. 1, 1983

[54] LOW COST LASER

[75] Inventors: Evan P. Chicklis, Nashua; James R. Mosto, North Conway, both of N.H.

[73] Assignee: Sanders Associates, Inc., Nashua, N.H.

[21] Appl. No.: 912,826

[22] Filed: Jun. 5, 1978

[51] Int. Cl.³ .............................................. H01S 3/00
[52] U.S. Cl. .................................... 372/77; 372/92
[58] Field of Search ................................ 331/94.5 G

[56] References Cited

U.S. PATENT DOCUMENTS

| 3,163,799 | 12/1964 | Buchman | 331/94.5 P |
| 3,271,696 | 9/1966 | De Ment | 331/94.5 P |
| 3,271,980 | 9/1966 | Boyd | 331/94.5 G |
| 3,309,620 | 3/1967 | De Ment | 331/94.5 P |
| 3,399,359 | 8/1968 | Ott et al. | 331/94.5 P |
| 3,577,095 | 5/1971 | Benner | 331/94.5 P |
| 3,646,471 | 2/1972 | De Ment | 331/94.5 P |

Primary Examiner—William L. Sikes
Assistant Examiner—Léon Scott, Jr.
Attorney, Agent, or Firm—Louis Etlinger; Richard I. Seligman

[57] ABSTRACT

A compact low-cost laser is provided by employing a solid state laser rod which is pumped by the optical radiation from the direct combustion of a metal in a flowing oxygen atmosphere.

11 Claims, 1 Drawing Figure

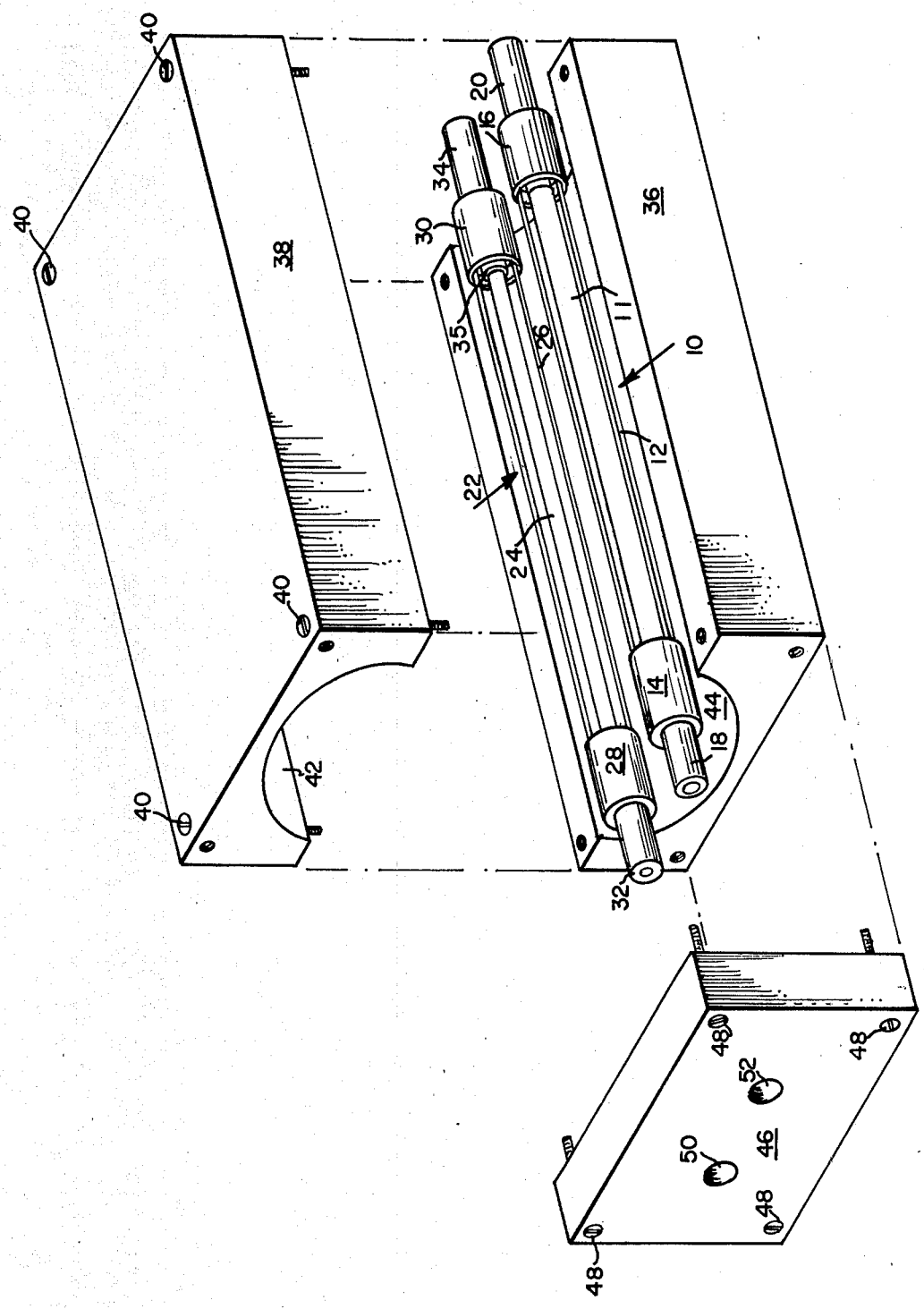

LOW COST LASER

The invention herein described was made in the course of or under a contract or subcontract thereunder with the Department of the Air Force.

BACKGROUND OF THE INVENTION

This invention relates to lasers and more particularly to lasers utilizing the radiation generated from certain exothermic, pyrotechnic reactions to directly pump the laser rod.

There are many applications requiring low-cost lasers including applications requiring expendable lasers. Many of these requirements are related to military applications. These requirements demand low-cost, simple, compact, and lightweight packages with the further requirement of some minimum operating time. One of the biggest problem areas in providing such lasers is the source for pumping the laser rod. Most lasers are pumped by flashlamps which require large batteries and capacitors for energy storage. This limits greatly the degree to which the size and cost of such lasers can be minimized.

In addressing this problem, it has been proposed that the lasers be pumped with a pyrotechnic charge such as compressed pellets and powders of aluminum, zirconium, and the like mixed with an oxygen supplying medium such as $KClO_4$. These techniques have not satisfied the problem for a number of reasons. One of the principal is that these reactions generate large quantities of smoke and gas which interfere with the optical pumping. Another problem is that the burning rate of these mixtures is very fast and difficult to control, and thus, laser operation has been achieved only for a few milliseconds. Binders have been employed to control the reaction rates. Binders, however, further add to the smoke and soot contamination of the reaction. A further problem is that the flame front associated with such pyrotechnic reactions extends well beyond the surface of the emitter rendering efficient imaging of the radiation virtually impossible using a compact reflector. Flashbulbs have also been used to pump lasers; however, the laser emission is also of very short duration. In order to increase the burning time, multiple sources (compressed pellets) have been fired in series. However, this method has not met with much success because of contamination problems, etc. This type of pump also requires a large reflector.

SUMMARY OF THE INVENTION

Accordingly, it is an object of this invention to provide an improved low-cost, optically pumped laser.

It is another object of this invention to provide an improved compact laser.

It is a further object of this invention to provide a low-cost, compact laser which can operate for substantial time periods.

It is yet another object of this invention to provide a compact, low-cost laser pump which has minimum smoke and soot associated therewith.

Briefly, in one embodiment a low-cost, compact laser is provided by a solid state laser rod which is pumped by a pump source consisting of the burning of a pure metal in a flowing oxygen atmosphere. In one embodiment the pump source comprises a zirconium metal foil wound about a graphite rod and enclosed in a tube to which flowing oxygen is admitted. Ignition of the metal foil is achieved by applying a large current to the graphite rod. Such a pump is relatively compact, has minimum smoke and soot associated therewith and permits laser operation in excess of one second.

BRIEF DESCRIPTION OF THE DRAWING

The above-mentioned and other features and objects of this invention will become more apparent by reference to the following description taken in conjunction with the accompanying drawing, which is an exploded view of a low-cost laser configured in accordance with the teachings of this invention.

DESCRIPTION OF A PREFERRED EMBODIMENT

Referring now to the drawing, there is illustrated thereby an embodiment of the invention. The low-cost laser includes a laser rod assembly 10 including a laser rod 11, typically Nd:YAG. Other solid state laser rods may be used instead, such as, $Ho:LiYF_4$, Nd:glass, $Dy^{+2}:CaF_4$, etc. The ends of rod 11 are coated to provide the reflective and partially reflective mirrors for the laser cavity as is well known. However, separate mirrors may be provided. The rod 11 is disposed within a transparent tube 12, which is typically made of quartz. End caps 14 and 16 are provided at the end of case 12 and have holes therein to accommodate stems 18 and 20. The function of the stems 18 and 20 is to allow a coolant, e.g., water to be supplied to the tube 12 to cool the laser rod 11, if required. The end caps and stems are preferably metal, such as, aluminum. Positioned next to the laser rod assembly 10 is the pump source 22 therefor. In this embodiment the pump comprises a rod having a metal foil wound thereabout 24. The rod and metal foil 24 is disposed within a tube 26 typically made of quartz, and the ends of the tube 26 have end caps 28 and 30 thereon for accommodating stems 32 and 34 to allow flowing oxygen to be applied to the tube 26. Typically the rod is graphite and the metal foil is zirconium. Other useful metal foils include aluminum, magnesium and thorium. The graphite rod is secured within graphite terminals 35 positioned within the end caps 28 and 30 and preferably held therein with a set screw, not shown.

The metal foil is preferably spiral wrapped about a rod and then slipped over the graphite rod before the graphite terminals 35 are attached (press-fitted) to each end of the graphite rod. The spiral wrapped foil cylinder is free to move on the graphite rod but is limited by the graphite terminals 35 at each end.

The laser rod assembly 10 and the pump source 22 is disposed within a housing comprising an upper housing portion 36 and a lower housing portion 38. These portions are preferably metal, e.g., brass or aluminum. Screws 40 are employed to fasten the upper and lower housing portions together. The interior portions 42 and 44 of the upper 38 and lower 36 housing portions are reflective, which collect and image the radiation from the pump source 22 onto the laser rod 11. Therefore, to provide maximum reflection these surfaces are plated with, for example, gold or silver and polished or the aluminum is polished.

The housing also includes two end sections 46 only one of which is shown in the figure. The end sections are fastened to the lower and upper housing portions 36, 38 vis screws 48. The end sections have holes 50, 52 therein for accommodating the stems 18, 20, 32, and 34. The inner surface of the end sections are also preferably plated and polished to provide maximum reflectivity.

End caps 14, 16 and 28,30 are slipped over the ends of the tubes 12 and 26, respectively, and sealed to the tubes using, for example, silicon rubber gaskets. The assembly is held in place by the end sections 46. Stems 18, 20, 32, and 34 are preferably made integral with the end caps 14, 16, 28 and 30, respectively; however, they can be separate pieces which are glued to the end caps. The laser rod 11 is preferably positioned in the bores of the stem/end caps 14, 18 and 16, 20 and held in place by an o-ring. Holes would then be drilled in the end caps to permit cooling fluid to reach the rod. These construction details are exemplary only, and they may be altered in many ways, since the construction details do not constitute part of this invention.

For an expendable laser the flowing oxygen would be supplied by a cartridge attached to stem 34. The coolant also could be obtained from a gas cartridge or from ram air. In some expendable applications, no cooling is required. When the metal foil is ignited by applying a large current to the graphite rod or using a separate squib, it is burned in the oxygen environment outputting sufficient amount of radiation to pump the laser rod 10 such that laser radiation is emitted from hole 52 in the end section. The reaction of the burning of the metal foil is relatively clean, that is, it has little smoke and soot associated therewith and allows the laser rod 10 to lase for a period of time in excess of 1 second.

The pumped laser is a CW laser. However, it can be modulated just as with any conventional CW solid state lasers by Q switching.

While we have described above the principles of our invention in connection with specific apparatus, it is to be clearly understood that this description is made by way of example and not as a limitation of the scope of our invention as set forth in the accompanying claims.

We claim:

1. A laser comprising:
  a resonant cavity including a solid state laser rod;
  means for abstracting energy from said cavity; and
  pumping means for pumping said laser rod, said pumping means including:
  a solid metal whose combustion in oxygen occurs at sufficiently high temperatures so that the ensuing optical radiation will maintain oscillations in said laser rod;
  a source of oxygen which will maintain combustion of said metal;
  means for providing a sustaining flow of said oxygen past said metal; and
  means for igniting said metal.

2. The laser as defined in claim 1, said pumping means further including a rod to support said metal foil, said rod having a high melting temperature, said metal foil being disposed about said rod.

3. The laser as defined in claim 2, wherein said metal foil is selected from the group consisting of:
  zirconium,
  aluminum, and
  thorium.

4. The laser as defined in claim 2, wherein said rod is graphite.

5. The laser as defined in claim 1, further including an optically transparent tube and means for accommodating said laser cavity within said tube.

6. The laser as defined in claim 5, further including means for supplying a fluid coolant to said tube to cool said laser rod.

7. The laser as defined in claim 1, wherein said pump means further includes a tube enclosing said metal foil and means for applying said oxygen to said tube.

8. The laser as defined in claim 1, further including a housing having a cavity for containing said resonant cavity and said pumping means.

9. The laser as defined in claim 8, wherein said housing cavity is of elliptical cross section.

10. The laser as defined in claim 8, wherein said housing cavity is highly reflective.

11. The laser as defined in claim 8, wherein said housing includes means for admitting oxygen to said pumping means and a coolant to said laser rod.

* * * * *

UNITED STATES PATENT OFFICE
CERTIFICATE OF CORRECTION

PATENT NO. : 4,371,969

DATED : February 1, 1983

INVENTOR(S) : Evan P. Chicklis and James R. Mosto

It is certified that error appears in the above-identified patent and that said Letters Patent are hereby corrected as shown below:

In column 4, lines 3, 8, 10 and 11 the word --foil-- should be added after the word "metal", each occurrence.

Signed and Sealed this

Fifteenth Day of November 1983

[SEAL]

Attest:

GERALD J. MOSSINGHOFF

Attesting Officer

Commissioner of Patents and Trademarks